(12) United States Patent
Huet et al.

(10) Patent No.: US 10,192,253 B2
(45) Date of Patent: Jan. 29, 2019

(54) FRESHNESS AND SEASONALITY-BASED CONTENT DETERMINATIONS

(71) Applicant: A9.com, Inc., Palo Alto, CA (US)

(72) Inventors: Francois Huet, Santa Cruz, CA (US); Anil A. Sewani, Mountain View, CA (US); Daniel E. Rose, Cupertino, CA (US)

(73) Assignee: A9.COM, INC., Palo Alto, CA (US)

( * ) Notice: Subject to any disclaimer, the term of this patent is extended or adjusted under 35 U.S.C. 154(b) by 465 days.

(21) Appl. No.: 14/797,924

(22) Filed: Jul. 13, 2015

(65) Prior Publication Data

US 2015/0317714 A1 Nov. 5, 2015

Related U.S. Application Data

(63) Continuation of application No. 12/563,696, filed on Sep. 21, 2009, now Pat. No. 9,081,857.

(51) Int. Cl.
*G06F 17/30* (2006.01)
*G06Q 30/06* (2012.01)
(Continued)

(52) U.S. Cl.
CPC ..... *G06Q 30/0625* (2013.01); *G06F 17/3053* (2013.01); *G06F 17/30386* (2013.01);
(Continued)

(58) Field of Classification Search
CPC .. G06Q 10/087; G06Q 30/02; G06Q 30/0255; G06Q 30/0269; G06Q 30/0601;
(Continued)

(56) References Cited

U.S. PATENT DOCUMENTS 8,065,199 B2 * 11/2011 Dumon ............. G06F 17/30979
705/26.7
8,645,221 B1 * 2/2014 Sarma ................ G06Q 30/0601
705/26.1
(Continued)

FOREIGN PATENT DOCUMENTS

WO 2005/057363 6/2005
WO 2008/019007 2/2008

OTHER PUBLICATIONS

U.S. Non-Final Office Action issued in U.S. Appl. No. 12/563,696 dated Sep. 28, 2011.
(Continued)

*Primary Examiner* — Srirama Channavajjala
(74) *Attorney, Agent, or Firm* — Hogan Lovells US LLP

(57) ABSTRACT

The relevance or ranking of various dynamically-determined instances of content can be adjusted or otherwise improved based on aspects such as the freshness or seasonality of the content. In many conventional relevance or ranking algorithms, factors such as popularity, performance, and profit are used to determine which content to present to a user, as well as how to display the selected content. Such algorithms do not necessarily reflect domain-specific knowledge very well, and thus fail to accurately select content that is of differing levels appeal at various ages of the content and/or during various seasons of the year. Freshness and/or seasonality adjustment scores can be used to generate improved relevance, selection, or ranking determinations for various categories of content.

17 Claims, 6 Drawing Sheets

(51) Int. Cl.
*G06Q 30/02* (2012.01)
*G06Q 10/06* (2012.01)

(52) U.S. Cl.
CPC .. *G06F 17/30598* (2013.01); *G06F 17/30675* (2013.01); *G06F 17/30864* (2013.01); *G06F 17/30867* (2013.01); *G06F 17/30876* (2013.01); *G06Q 10/067* (2013.01); *G06Q 30/0278* (2013.01)

(58) Field of Classification Search
CPC .......... G06Q 30/0641; G06Q 30/0633; G06Q 30/0278; G06Q 10/067; G06F 17/30867; G06F 17/30274; G06F 17/30554; G06F 17/3056; G06F 17/3053; G06F 17/30616; G06F 17/30864; G06F 17/30675; G06F 17/30386; G06F 17/30876; G06F 17/30598
See application file for complete search history.

(56) References Cited

U.S. PATENT DOCUMENTS

| | | | |
|---|---|---|---|
| 2002/0103789 A1 | 8/2002 | Turnbull et al. | |
| 2002/0133417 A1* | 9/2002 | Hanks | G06Q 30/02 705/27.1 |
| 2002/0138334 A1* | 9/2002 | DeCotiis | G06Q 10/067 705/7.32 |
| 2002/0138492 A1 | 9/2002 | Kil | |
| 2003/0105682 A1 | 6/2003 | Dicker et al. | |
| 2003/0120536 A1* | 6/2003 | Blanchard | G06Q 30/02 705/7.31 |
| 2003/0204449 A1* | 10/2003 | Kotas | G06Q 10/087 707/781 |
| 2005/0004889 A1 | 1/2005 | Bailey et al. | |
| 2006/0041562 A1* | 2/2006 | Paczkowski | G06F 17/30884 |
| 2006/0184495 A1* | 8/2006 | Crosby | G06F 17/30867 706/60 |
| 2006/0259358 A1* | 11/2006 | Robinson | G06Q 30/02 705/14.41 |
| 2007/0174872 A1 | 7/2007 | Jing et al. | |
| 2007/0198510 A1* | 8/2007 | Ebanks | G06Q 30/02 |
| 2007/0288433 A1 | 12/2007 | Gupta et al. | |
| 2008/0028010 A1 | 1/2008 | Ramsey | |
| 2008/0033841 A1 | 2/2008 | Wanker | |
| 2008/0040341 A1 | 2/2008 | York et al. | |
| 2008/0082528 A1* | 4/2008 | Bonzi | G06F 17/30867 |
| 2008/0183691 A1 | 7/2008 | Kwok et al. | |
| 2009/0024605 A1* | 1/2009 | Yang | G06F 17/30867 |
| 2009/0094138 A1* | 4/2009 | Sweitzer | G06Q 30/06 705/26.1 |
| 2009/0106222 A1 | 4/2009 | Liu et al. | |
| 2009/0234711 A1 | 9/2009 | Ramer et al. | |
| 2010/0114615 A1* | 5/2010 | Ganguly | G06F 17/3053 705/5 |
| 2010/0169331 A1 | 7/2010 | Karidi et al. | |
| 2010/0257165 A1 | 10/2010 | Jin et al. | |
| 2010/0262602 A1* | 10/2010 | Dumon | G06F 17/30979 707/728 |
| 2011/0040760 A1 | 2/2011 | Fleischman et al. | |
| 2011/0099131 A1 | 4/2011 | Sellamanickham et al. | |
| 2011/0295716 A1* | 12/2011 | Dumon | G06F 17/30979 705/26.61 |

OTHER PUBLICATIONS

U.S. Final Office Action issued in U.S. Appl. No. 12/563,696 dated Jan. 17, 2012.
U.S. Non-Final Office Action issued in U.S. Appl. No. 12/563,696 dated Sep. 17, 2012.
U.S. Final Office Action issued in U.S. Appl. No. 12/563,696 dated Feb. 6, 2013.
U.S. Non-Final Office Action issued in U.S. Appl. No. 12/563,696 dated Jul. 25, 2013.
U.S. Final Office Action issued in U.S. Appl. No. 12/563,696 dated Nov. 6, 2013.
U.S. Non-Final Office Action issued in U.S. Appl. No. 12/563,696 dated Apr. 2, 2014.
U.S. Final Office Action issued in U.S. Appl. No. 12/563,696 dated Sep. 5, 2014.
U.S. Notice of Allowance issued in U.S. Appl. No. 12/563,696 dated Mar. 24, 2015.

* cited by examiner

FRESHNESS AND SEASONALITY-BASED CONTENT DETERMINATIONS

CROSS-REFERENCES TO RELATED APPLICATIONS

This application is a continuation of allowed U.S. application Ser. No. 12/563,696, entitled "FRESHNESS AND SEASONALITY-BASED CONTENT DETERMINATIONS," filed Sep. 21, 2009, which issued on Jul. 14, 2015, as U.S. Pat. No. 9,081,857, and is incorporated herein by reference for all purposes.

BACKGROUND

An increasing amount of content is being viewed and purchased electronically, such as over the Internet, as opposed to through traditional outlets such as physical "brick and mortar" stores. As the number of electronic retailers offering items or other such content for consumption (e.g., purchase, rent, or download) increases, for example, it is becoming ever more important to properly market and display content to users and potential customers. Traditional display models and campaigns used in physical stores do not always translate well to an electronic environment where varying selections of content to be displayed are often determined dynamically. Physical stores and other relatively static environments can utilize kiosks, large physical displays, end-of-aisle displays, and other such approaches to quickly and easily promote specific items to customers. Such static displays may not perform well in environments where content is selected and/or generated dynamically, such as in response to a user query, however, as there can be little control over the content that will actually be selected. Further, it can be difficult to determine which of the dynamically-selected content should be featured or otherwise prominently displayed.

In an electronic environment such as an electronic marketplace, for example, there is much less space available to present content to the customer, as the customer typically is viewing content in an interface such as a browser on a client device, and typically there will only be one page of information displayed to that customer at any given time. A user navigating in such an environment often will search for certain items by submitting one or more keywords. Various ranking and/or selection algorithms are used to dynamically determine which items to display and/or feature to a customer based at least in part upon the submitted keyword(s). This determination typically involves a number of factors representing different dimensions on how well an item is likely to correspond to a given request. These factors do not necessarily reflect domain-specific knowledge very well, for instance the fact that new high fashion items are more desirable than old high fashion items, or that summer dresses are less desirable in winter than in summer. Further, ranking algorithms often take into account factors such as the popularity of an item when determining which items to display. For items such as high fashion items where there may not be many items sold at any given time, the lag needed to accumulate enough data for the item to rise in the popularity ranking can be longer than the period when the item is actually highly desirable. The inability to optimally select and/or display seasonal content near the beginning of a season can result in a loss of sales, views, or other such actions. While manual changes can be made in some situations, many electronic retailers and other content providers manage many different types of items and other content in various categories, groups, or classes, such that it is not practical to manually manage the seasonal and other such variations.

BRIEF DESCRIPTION OF THE DRAWINGS

Various embodiments in accordance with the present disclosure will be described with reference to the drawings, in which.

DETAILED DESCRIPTION

Figure 1:
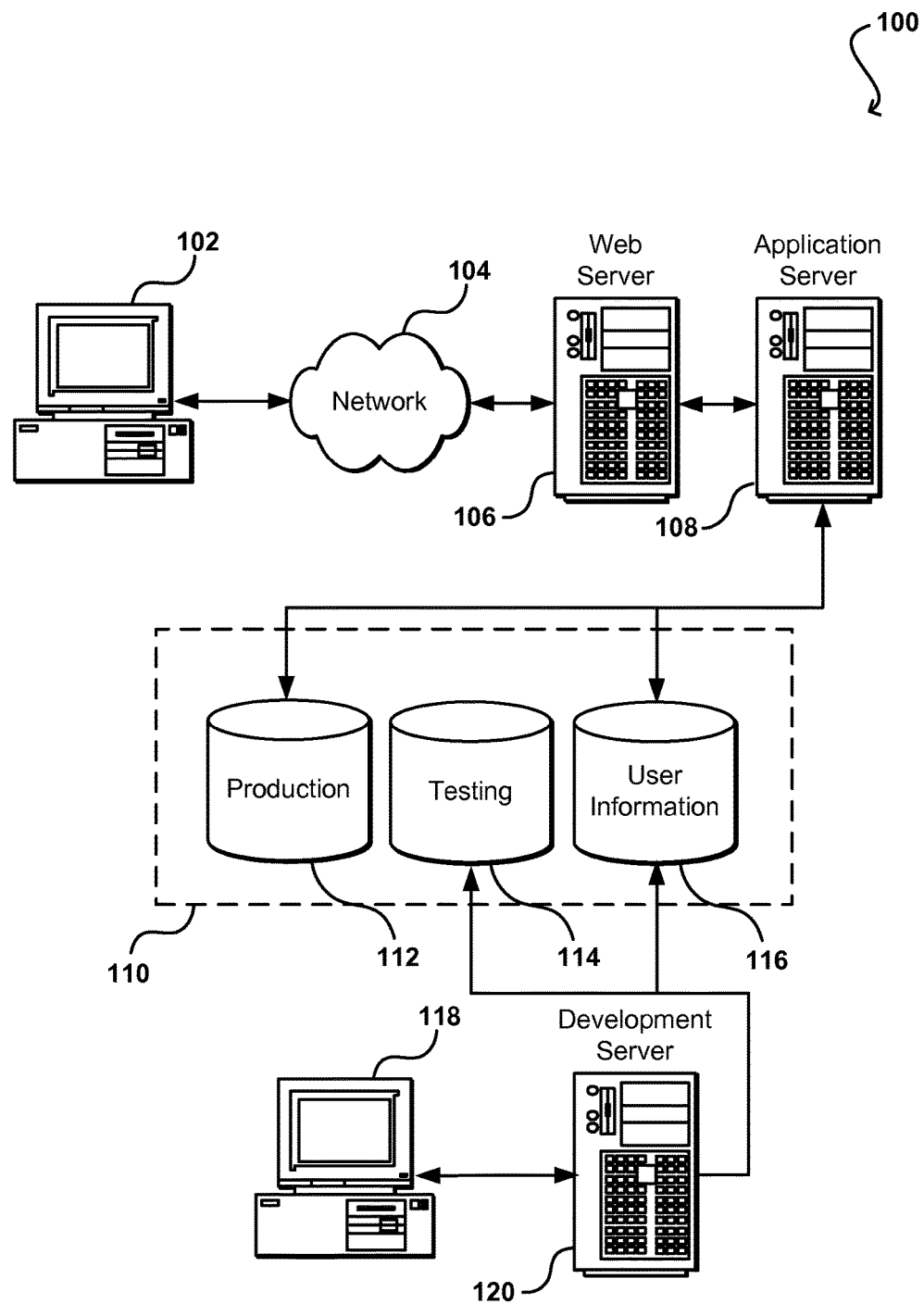
FIG. 1 illustrates an environment in which various embodiments can be implemented.

Systems and methods in accordance with various embodiments of the present disclosure may overcome one or more of the aforementioned and other deficiencies experienced in conventional approaches to dynamically selecting and managing content to be presented in an electronic environment. In various embodiments, one or more seasonal or freshness functions can be selected for different items, instances, or types of content to determine various factors or scores that can be used to determine and/or adjust relevance or ranking scores for the content. When dynamically selecting content to display to a user, for example, a system will often utilize relevance or ranking scores to determine which content to display, how and where to display the content, etc. An example environment for dynamically selecting such content is an e-commerce application that presents item information as search results, although various other types of dynamically determined content can be utilized as well within the scope of the various embodiments. In an e-commerce application, with everything else being equal, newer items and/or items that are in season might be more desirable than older items or out-of-season items that might be displayed more prominently. Many content selection algorithms do not take into account factors such as freshness and seasonality. Further, in ranking algorithms that rely on behavioral data, for example, new items, or items at the beginning of a season, may not have enough data accumulated to appear prominently in the rankings, so the display of these items often experiences a lag until enough data is accumulated to increase the relevance or ranking scores for the items. Determining and applying seasonality and/or freshness scores for these items or types of items can minimize this lag and/or help feature the items at specific times.

In some embodiments, a freshness function or similar function, model, or algorithm can be associated with at least certain types or categories of items or content, such as by setting one or more attributes, whereby the associated content can receive an adjustment or "bump up" in the ranking or relevance scores when the content is relatively new, or when the product might otherwise have a greater (or lesser) level of appeal based at least in part upon an age of the item. The function can vary over time, such that the amount of freshness adjustment can decrease as the content ages and/or as data is accumulated. For certain types of content, a negative adjustment can even be applied after the content reaches a certain age. Factors such as the amount of adjustment and the length of time for the adjustment as determined by the various functions can vary between items, types of items, etc. While the term "freshness" is used to represent an age-related aspect (e.g., appeal or desirability) of an item or instance of content, it should be understood that a freshness function can increase or decrease adjustments or scores, or both, at various times and by varying amounts depending upon the "age" of the content, for example, and in many embodiments is not directly proportional to age or newness.

In some embodiments, a seasonality function or similar function, model, or algorithm can be associated with at least certain types or categories of items or content, such as by setting one or more attributes, whereby the content can receive an adjustment or "bump" in the ranking or relevance scores when the content is "in season" or is otherwise of increased appeal or desirability over one or more periods of time each year, month, etc. The function can vary over time, such that the amount of adjustment can increase near the beginning of a season, for example, and decrease over the course of the season. For certain types of content, a negative adjustment can even be applied when the content is out of season, or in particular other seasons, for example. Factors such as the amount of adjustment and the length of time for the adjustment as determined by the various functions can vary between items, types of items, etc.

Certain embodiments can utilize both seasonality and freshness functions to assist in anticipating or guiding aspects such as behavioral changes. In some cases, more than one seasonality function can apply for a given item or class of items, for example, and these functions can be combined when generating a seasonality score at any particular time. In some cases, default or initial functions can be applied, and these functions can be tuned over time based on performance and other such data. The number of functions used can vary between embodiments. Further, the way in which the factors are applied (e.g., additive or multiplicative) can vary as well.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a content provider or publisher, such as an electronic retailer or a provider of an electronic marketplace, wherein various types of items and other such content can be provided to display for customers of the marketplace. The electronic environment in such a case might include additional components and/or other arrangements, such as those illustrated in the configuration 200 of FIG. 2.

In this example, a content provider 202 can generate and serve content, such as via pages of a site, available to any appropriate end user 206 able to connect to the provider through an appropriate network 214, such as the Internet. The content provider can utilize components such as a page generator 210 operable to communicate with a production data store 208 to obtain data and generate pages that can be served by a page server 212 (such as a Web server in a Web-based environment) over the network 214 to the end user 206. The page generator can include one or more components, devices, or services for generating pages of content, such as may include ranking algorithms, search systems, data store interfaces, and various other components for selecting which content to display and how to display the selected content. While many of the embodiments are described with respect to a Web-based environment, it should be understood that pages are not limited to Web pages, but can include any application page or other interface page that can be displayed or otherwise conveyed to a user.

The content provider 202 in some embodiments can receive information from at least one external entity 204. The entity 204 can be an advertiser, for providing advertising content, and/or can be a type of content provider, for providing content such as items offered for consumption by the external entity, news articles prepared by the external entity, etc. In certain embodiments, the external entity can be affiliated with, or part of, an electronic retailer providing an electronic marketplace, while in other embodiments the external entity can be a separate or third party provider. The external entity can have similar components, such as one or more data stores, content generators, and content servers for delivering the content to the content provider 202. Components of the external entity 204 and the content provider 202 can work together to provide information of interest to the end user. The content provider system also can include a synchronization manager 216 that can work with a synchronization component of the advertiser 204 to periodically synchronize content, such that current and appropriate content is being utilized and displayed by the content provider system 202.

The content provider may select to provide advertisements to the user, which may relate to content from the external entity 204. In this example, the content provider system includes an advertising manager 218, which can encompass, monitor, and/or control a number of different algorithms and components for selecting and deciding upon pages on which to display ads, as well as dynamically determining when to show certain ads and selecting appropriate ads to show for each category, classes of users, specific items, etc. When the advertising manager 218 decides on an advertisement to be associated with content on the provider pages, the advertising manager 218 can store the advertising data to an advertising data store 220, which in some embodiments can comprise separate tables in the production data store 208.

Figure 2:
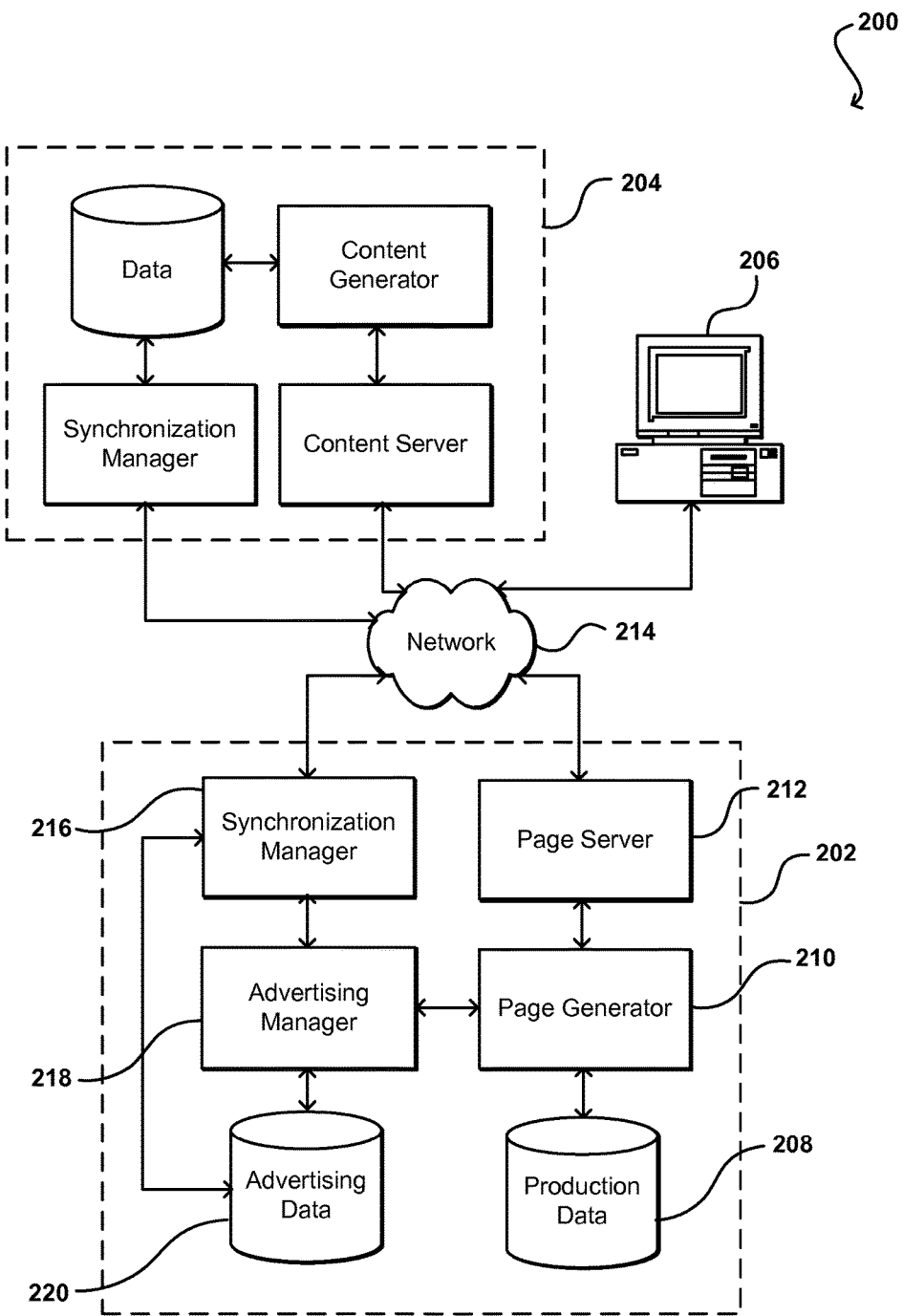
FIG. 2 illustrates components for managing advertisement content related to items and for processing bids to display advertisements that can be used in accordance with one embodiment.

A system such as that described with respect to FIG. 2 can be used to provide access to various types of content, such as through a Web site or electronic marketplace. As known in the art, there are various ways to enable users to navigate through the content offered by a provider, such as by searching for specific content using keywords or queries, or by browsing through the content based on categorizations, related links, or various other navigational elements. Also as known in the art, it can be desirable to attempt to rank or otherwise dynamically select content to be presented to a customer that is most likely to be of interest to the customer, as the customer will be more likely to return to the site, purchase an item, or perform any of a number of other desirable actions. Any of a number of different algorithms can be used to attempt to rank or dynamically select content to display to a user based on a number of factors, such as popularity information, user interest or preferences, past performance data, etc.

As discussed, however, such algorithms often do not reflect domain expertise regarding the appeal of an item based on its type and age, or its seasonality. Even algorithms that leverage behavioral data are "reactive" and thus inherently have a lag time built in as enough data must be gathered to determine and/or adjust the content's place in the rankings, determined amount of relevance, etc. For example, if a product review is released on a site where it typically takes thousands of users accessing the article before the review is ranked as a "hot" review, due to a popularity over a given time, the review must first be viewed by thousands of users before obtaining a prominent spot in the rankings. This is further complicated by the fact that it can be harder for users to find the review in the first place, as it might be ranked relatively low in search results, category listings, etc. The lag time might prevent the review from being featured shortly after the availability of the review, when it may be of most interest to potential readers.

In an electronic retail context, for example, items such as seasonal and high fashion items are typically desirable over specific periods of time, which can be relatively short in some cases. For example, high dollar designer fashion items might be very desirable the first couple of weeks after release, as customers buying these items typically want to be the first to wear this season's new fashions, and the items may have a relatively quick drop-off in popularity, as customers typically will not spend money on expensive clothing that is considered to be "last season's" style. Similarly, items such as Christmas items in the United States might be very popular the day after Thanksgiving, and may see a sharp drop-off the first week of the new year. In either case, not reflecting this time-based appeal in the rankings, or reflecting it with a lag can potentially result in a loss of sales revenue. For example, if holiday items are highly desirable the day after Thanksgiving but it is necessary to accumulate enough data to adjust the popularity rankings, sales might be lost to competitors who were able to more prominently feature the holiday items at the beginning of the desirability period. Further, if high fashion items are not featured until weeks after the fashions are released, a retailer might have difficulty getting customers to pay full price for those items, as the retailer was not able to feature those items at their most desirable point in time.

One approach would be to always favor newer items over older items. This approach would not be applicable in all cases, however, as various items like tires and tube socks might have relatively stable desirability values over time. A pair of socks designed yesterday is not necessarily any more desirable than a pair designed two years ago. In such cases, popularity or user rating information actually might be a better indicator, as a customer may actually be more interested in socks that other customers purchased repeatedly due to factors such as quality, fit, etc., instead of the newest sock available through the site.

Another approach would be to always favor items for a particular season, such as by applying a single adjustment factor to seasonal items during a certain period of time. This also would not be adequate in many situations, as items can be more popular towards the beginning of the season, might have a ramp-up period before the season, and can have various other fluctuations that cannot otherwise be adequately represented in the results.

Systems and methods in accordance with various embodiments can address at least some of these and other deficiencies in existing approaches by utilizing at least one seasonal function, freshness function, or combination thereof in order to adjust and/or determine the selection, placement, and/or display of content to a user. Each function can be at least partially time-dependent, such that a factor generated by either function can depend at least in part upon variables such as the time of year, date, time of day, holiday schedule, product release date or cycle, etc. The functions also can vary depending on a type, category, or other such classification of item or content. For example, a different function or set of values could be used for snow boots than could be used for hiking boots, as well as could be used for sandals. Further, high fashion or designer fashion items might have a different function or set of values than everyday items. Each function or set of values can be thought of as a graph or plot of values over time, which can represent an appeal or desirability lifecycle for each item. For seasonal functions, the same set of values can be used each year (or other appropriate period) in some embodiments. For freshness functions, adjustments might be made within a certain amount of time after first availability, and after a certain amount of time no freshness factor or score might be calculated and/or applied. In the case of items such as high fashion items, there might even be a negative factor applied after a certain period of time, such that the items can be less prominently featured than everyday items, etc. Various other approaches and/or transformations can be used as well within the scope of the various embodiments.

For purposes of explanation, the following will utilize examples for apparel items offered through an electronic marketplace, but it should be understood that various other types of content offered for viewing and/or consumption in an electronic environment can be utilized with, and take advantage of, aspects of the various embodiments.

Figure 3:
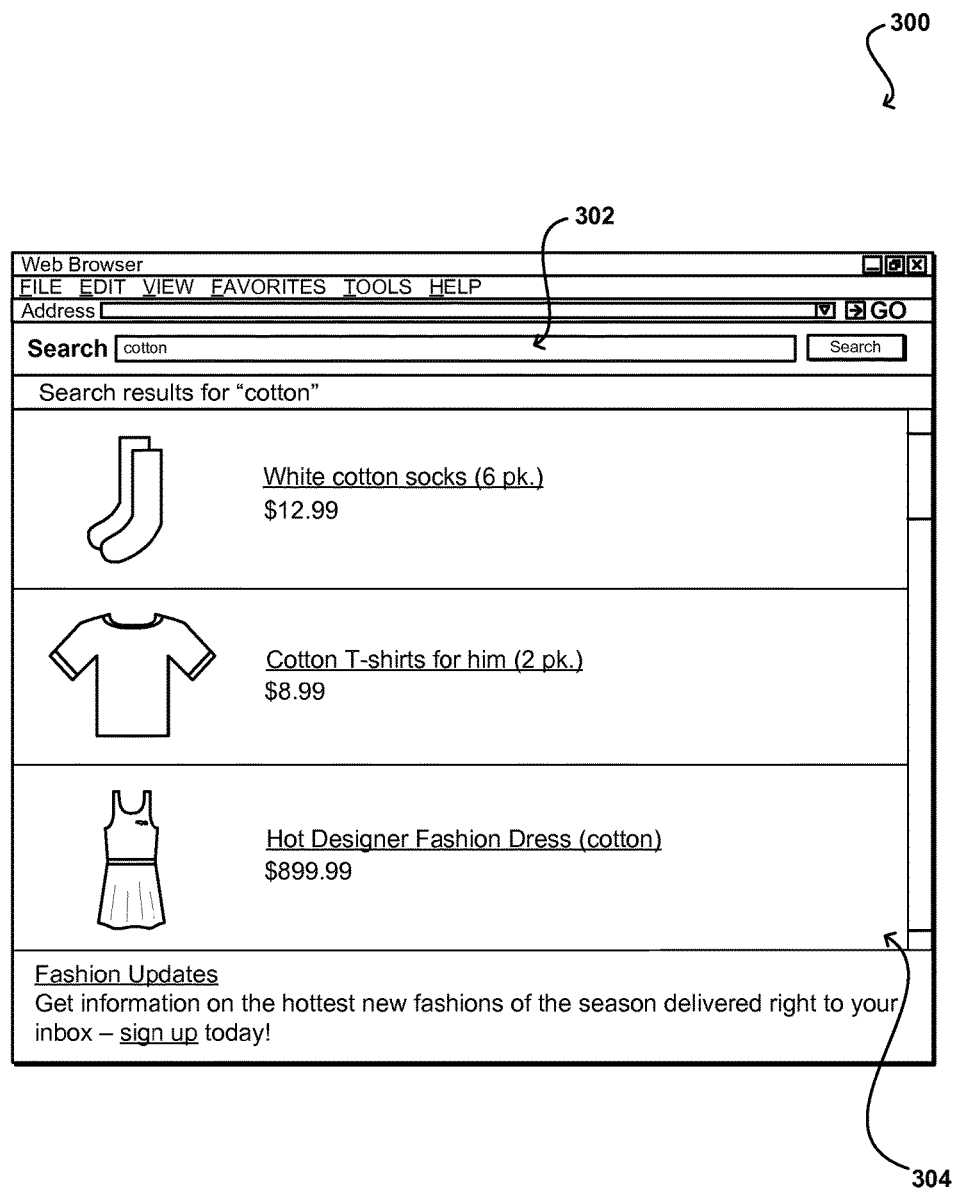
FIG. 3 illustrates an example display including ranked content that can be provided in accordance with one embodiment.

In an example of an electronic marketplace offering various types of items for consumption (e.g., purchase, rent, lease, or download), it can be desirable in at least some embodiments to adjust the display of apparel-related content in an electronic marketplace in a way that mimics the experience a customer might have in a physical clothing store. For example, FIG. 3 illustrates an example of a display 300 that might be presented to a user via an electronic marketplace. In this example, the customer has submitted the keyword "cotton" 302 to search for items of apparel. In response, the customer is presented with a results page that includes results for various items 304 dynamically determined to match the keyword "cotton." As can be seen, the results in this example have a pair of socks featured at the top of the search results list, followed by a t-shirt and then a fashion dress. In certain contexts this might appear to be optimal, as socks might be purchased more often than t-shirts, and in many contexts would be purchased more often than designer dresses. Such organization does not follow marketing approaches used in typical retail stores, however.

Figure 4:
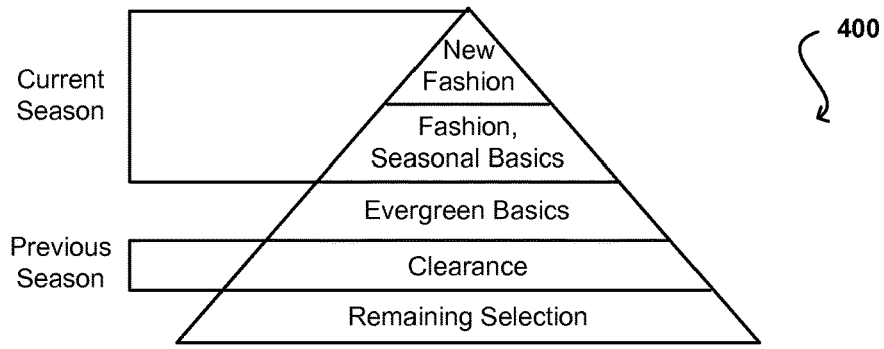
FIG. 4 illustrates an example an apparel desirability chart that can be used in accordance with one embodiment.

For example, FIG. 4 illustrates one conventional approach 400 to organizing items in a typical clothing store. As can be seen, new "fashion" items (e.g., designer or other high end apparel items) are given the highest priority, followed by fashion items that are not as new, and then by seasonal basics (e.g., sweaters for the winter season). Thus, the top two categories apply to the current season. The next priority includes "evergreen" items, or items that are typically at the same level of demand independent of seasons or freshness, such as socks and underwear. The next priority in this example includes clearance items, or items from the previous season that are offered at a discount in order to clear the items out of inventory. Any remaining items are of the lowest priority.

As can be seen, the new fashion items for the current season in such a scheme are given the highest priority, such as might be displayed at the end of an aisle, on a mannequin or wall, etc. The evergreen items may not be featured, but might be found in any general area of the store, such as on normal shelving or in an appropriate aisle. Lower priority might be given to clearance items, or items from last season, which often are found in clearance racks near the back of the store. The use of seasonal and/or freshness algorithms or functions can attempt to replicate such an approach in an electronic environment, while still incorporating existing relevance features to create a ranking that takes into account the information gathered from various customers. For example, displays often work in physical stores because the displays are viewed by customers who have navigated to that section. Displays that are not in sections of interest to a customer might not be seen by the customer at all. In an electronic environment, it thus can be desirable to replicate this experience by taking into account information about the customer, such as purchasing or browsing habits, preference information, etc., to ensure that the customer sees the "displays" or featured items that are likely to be of interest to the customer. Even if the latest designer line includes the hottest items of the season, there may be little value to showing these items to a customer that never views or purchases such items.

According to the apparel pyramid approach of FIG. 4, the results of FIG. 3 should be ranked differently at different times depending upon a number of different aspects. For example, if the designer fashion dress is new, and is in season, then an adjustment might be desirable to apply such that the dress is featured above the socks in the results. A customer coming to the site to purchase socks might navigate through the site until information for the socks is displayed, but the customer might not know about a new fashion item for the season such that it might be more desirable for the provider to feature the fashion item to the customer, as the customer might not otherwise view the fashion item. If it is the summer season, and the dress was from last season, then the most desirable item to feature might be the t-shirt, followed by the socks and then the fashion item.

The pyramid approach is a good starting point, but it may not accurately represent the behavior at a level of granularity that is desired in all embodiments. For example, the appeal of a seasonal item can vary over the course of the season, such that a single seasonal adjustment factor may not be optimal. For example, at the first day of the season the appeal might be 100%, while fifty days later the appeal might be around 60%. Thus, it can be desirable to track or determine these changes in appeal, and develop adjustment functions that can accurately apply adjustment factors that are appropriate for the point in time of the adjustment. The adjustment factors (or scores, etc.) can be used in combination with various other relevance scoring features (e.g., product behavioral data, product category proximity, etc) to generate a final ranking or relevance score for each item. For example, each factor can be an additive or multiplicative factor that is applied to a determined relevance score for an item, that can be applied in many different ways, such as a boost score or other such factor applied to a popularity or behavioral component or other specific relevance component. In other embodiments, the ranking might be based entirely upon seasonal and/or freshness scores, etc. Since one reason for the adjustment can be to compensate for a lack of data for new items, applying the adjustment as a multiplier to popularity or other such specific factors may not be particularly effective in some embodiments.

One approach to determining item or content ranking addresses the "seasonality" of items, or the trend of certain items or types of items to be more or less desirable at different times of year, particularly where the desirability can change relatively abruptly. A seasonal factor can be applied to various items in some embodiments based upon one or more attributes associated with each item or group of items. In some cases this can be a "seasons" attribute, which can be specified for an item. In some embodiments, a human expert, deterministic algorithm, or other such source can generate different lifecycles that apply to specific types of items or content. A "seasons" or similar attribute can specify one of these lifecycles, or can specify that no seasonal adjustment should be made. In some cases, a lifecycle can be specified for each item in a category or subcategory, each item of a specific type, etc. The factor can enable the items to move up in the rankings as those items become "in season" and move down the rankings as those items go out of season. A similar mechanism can be used for other time-sensitive occasions when the desirability of specific groups of items changes rapidly, such as Valentine's Day themed items, Halloween costumes, etc., where the demand from customers fluctuates relatively quickly.

Figure 5:
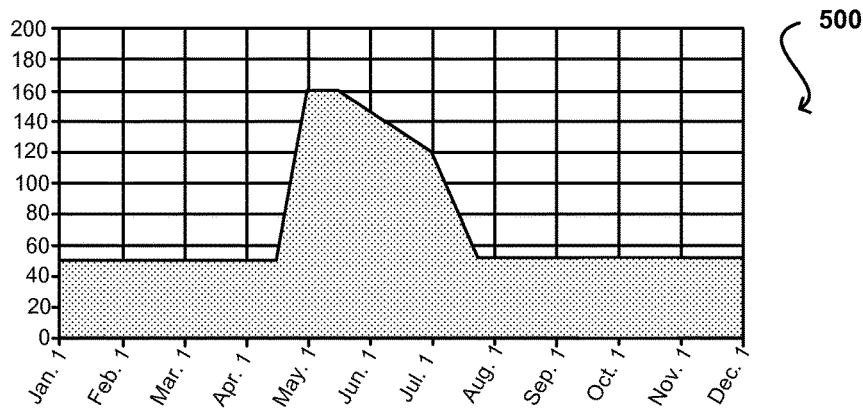
FIG. 5 illustrates an example of a seasonality function that can be used in accordance with one embodiment.

Each function or lifecycle can be thought of as a set of values that can be represented by a graph or time-plot that indicates how seasonality evolves through the year for specific types, classes, or groups of items or other content. For example, FIG. 5 illustrates an example of a seasonality function 500 for items that are popular during a "summer" or similar apparel season. As can be seen, the demand for these items is relatively stable throughout a large portion of the year. Towards the end of April, however, the demand starts to pick up until the demand hits a peak around May 1, when a lot of the new summer fashions might be released and customers start thinking about summer items. The demand remains high for the first half of May, after which the demand drops off slightly through July 1. During the first couple weeks of July, the demand drops of quickly until by about the third week of July the heightened demand for summer fashions has subsided, as customers likely are shopping for fall and/or back-to-school fashions. Thus, a maximum factor might be generated for items associated with this function during the first two weeks of May, and little or no factor might be generated from the end of July through the middle of April.

One way to represent this function would be to store a set of discrete points, such as a point for each time the slope of the curve changes (e.g., inflection points or discontinuities) and a set of end points. In other embodiments, continuous functions can be determined, such as by using curve-fitting algorithms, to attempt to produce more accurate results. The continuous functions can be substantially more processor intensive and may produce only slightly more accurate results, however, such that the difference might not be worthwhile in some embodiments.

In one embodiment, there might be a limited number of season functions defined, such as spring, fall, winter, summer, and maybe holiday and back to school, etc. Other category-specific seasons might also be defined, such as "spring 2/summer" for apparel, as used in the industry. Each item could be associated with one of these functions, or could have no seasonal adjustment applied. It should be understood, however, that the number of seasonal functions defined can vary between embodiments, to the point where in certain systems there might be a seasonal adjustment calculated, assigned, or otherwise determined for each individual item, category, sub-category, or other such classification.

A similar approach can be used for the freshness of an item. Although the freshness is a function of time of availability, for example, the freshness of an item is not necessarily directly proportional to the age of the item. In apparel, particularly high fashion apparel, newer items often are more desirable. The desirability or appeal of various items changes differently over time, however, as high fashion items become "stale" very quickly, while "replenishments" (e.g. socks) typically do not. Other items, such as wine or antiques, might actually increase in desirability over at least a period of time. For example, the latest vintage of wine might be highly desirable until the next vintage is released, at which point it might lower for a period of time. As the wine gets closer to its best drinking age, the desirability of the wine might increase. At some point, the wine can reach the end of its "drinkable" lifetime, after which the desirability of the wine might drop off quickly. Various other complex scenarios can be envisioned for various other types of content.

Figure 6:
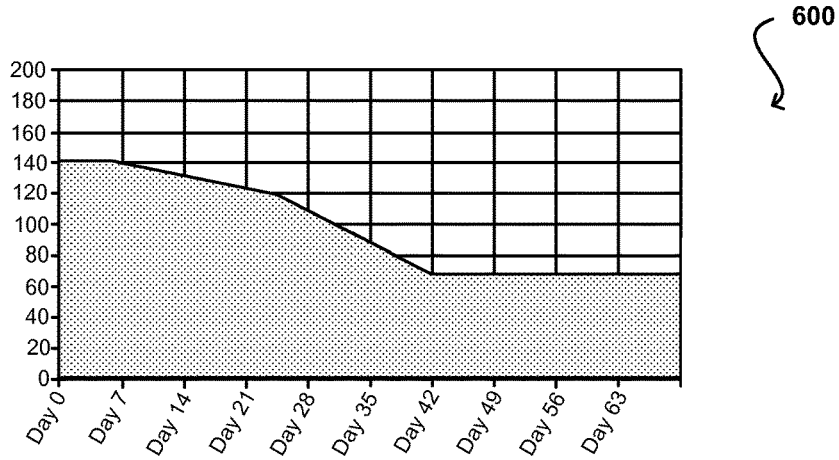
FIG. 6 illustrates an example of a freshness function that can be used in accordance with one embodiment.

FIG. 6 illustrates an example of a freshness function 600 that can be used in accordance with one embodiment. In this example, an item is introduced on a given day, corresponding to Day 0 (or Day 1) of the age or availability of the item. As can be seen, this item has maximum desirability associated during the seven days, after which the desirability starts to decline slightly through about the twenty-fifth day, and then declines more sharply until about Day 42, after which there may no longer be any freshness adjustment applied or freshness score determined. Such a function could be used to "bump" items in the rankings that are associated with this function for a specific period of time, with the amount of adjustment also being a function of that period of time.

As discussed, freshness adjustments can be desirable in at least some embodiments because, by definition, new items have no history data accumulated. Conventional ranking systems do not attempt to "reward" items simply for being new, but can attempt to compensate for a lack of historical data. For example, in an e-commerce context, ranking systems can attempt to compensate for the lack of sales history data by utilizing sales predictions based on similar items or other such factors, such as is described in co-pending U.S. patent application Ser. No. 12/045,470, filed Mar. 10, 2008, entitled "System and Method of Determining a Relevance Score," which is hereby incorporated herein by reference. Such mechanisms do not, however, distinguish between the shelf life of fashion items and other items, for example, and attempt to solve a different problem, in particular the lack of data for a new item. By not rewarding fresh items, an electronic retailer can inadvertently feature older fashion items, which can give the appearance that the retailer is a discounter, outlet, or otherwise does not offer clothing per the latest trends and fashions. Such an impression can limit the ability of the retailer to attract high-end brands, which in turn limits the selection that can be offered to customers. As discussed, for items such as high fashion items, a freshness function can be used to not only provide a boost to new items, but also to penalize older items to lower those items in the rankings.

In some embodiments, items can have at least one of a seasonal and a freshness factor applied at various times. For example, a fashion item might get a first bump from a freshness factor when the item is new, and might get a second bump when the item is also "in season." Further, some items might get a freshness bump when the items are new, and then later will get a seasonal bump when the item is in season, but might not also be new enough to get a freshness bump. Various other combinations and variations can apply as well. For both freshness and seasonality, however, domain-specific expertise can allow a provider to merchandise specific classes of items and compensate for the lag inherent to behavioral data, particularly where that lag can be most detrimental to the user experience for various customers. The ranking or other relative prominence of various items thus can be "nudged" up or down using query-independent, non-behavioral features, such as are referred to herein as "FreshnessScore" and "SeasonalScore."

These two scores can help to adjust the ranking of various items to favor items similar to the pyramid approach described with respect to FIG. 4. Both types of functions or plots can be represented using only the relative inflexion points, where the dates can be relative (e.g., 90 days after the introduction of the item) or absolute (e.g., March 15). The number of inflection points may not be limited in at least some embodiments, such that the plots can be extremely flexible.

Figure 7:
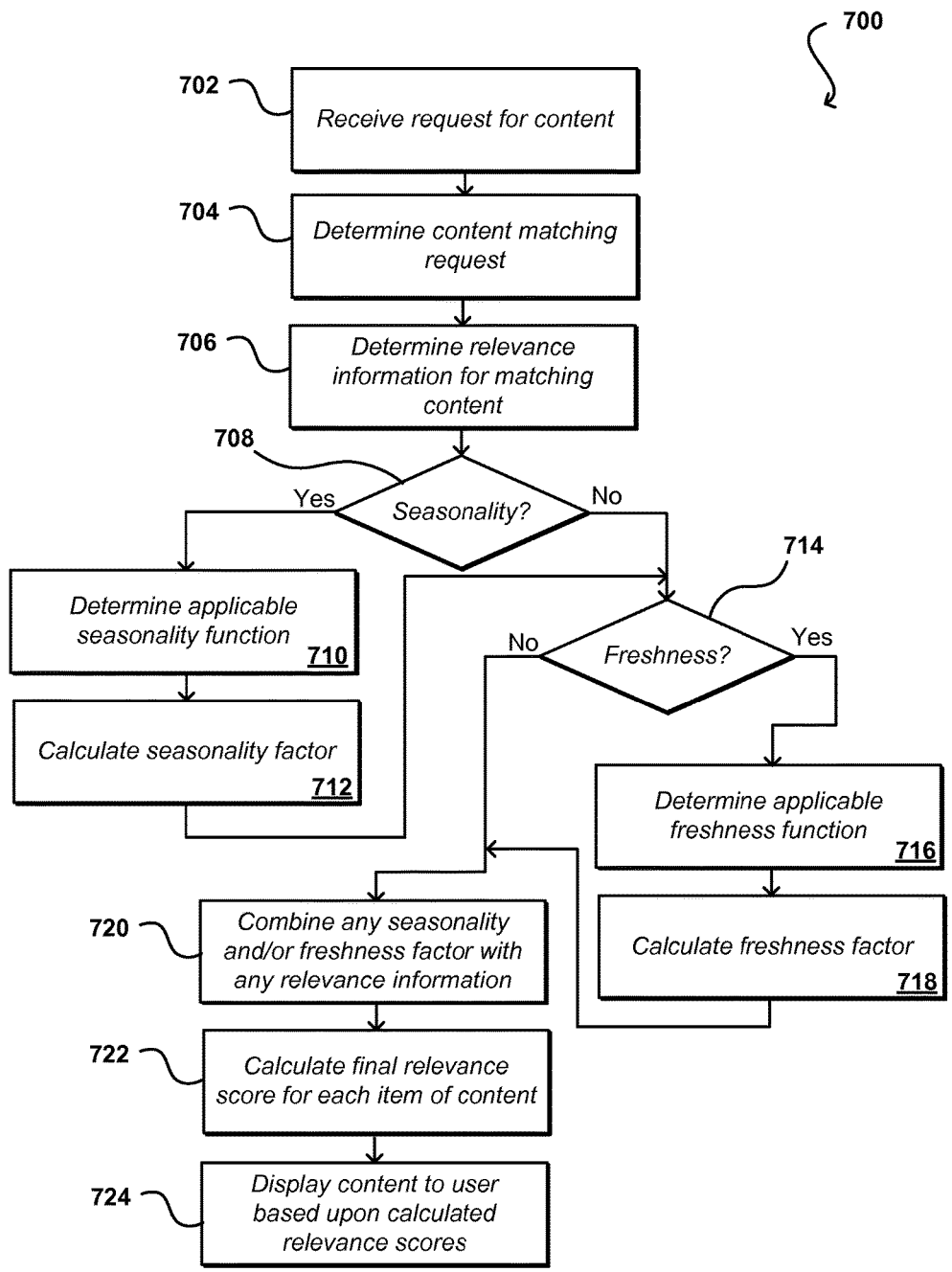
FIG. 7 illustrates steps of a process for determining and applying freshness and/or seasonality factors that can be used in accordance with one embodiment.

FIG. 7 illustrates an example of a process 700 for utilizing seasonal and/or freshness factors for item rankings or other relevance determinations that can be utilized in accordance with various embodiments. In this example process, a request is received from a user for specific content 702. As discussed above, this can include a user selecting an option of a hierarchical browse tree, following a specific link or navigational element for an item or type of item, submitting a query or keyword through a search feature, etc. In response to receiving the request, a set of items matching or otherwise satisfying the request is determined 704. For at least some of the set of items, relevance information (e.g., behavioral, historical, performance, user preference, and/or other such information) is determined for use in generating a ranking or relevance score for each item 706. As discussed with respect to some embodiments, however, such relevance information may not be utilized. For each item for which a relevance score is being generated, a determination can be made as to whether a seasonality function is associated with the item 708. If so, the appropriate seasonality function is determined 710 and the current date and/or other such information is used to calculate an appropriate seasonality factor 712. For each item for which a relevance score is being generated, a determination also (or alternatively) can be made as to whether a freshness function is associated with the item 714. If so, the appropriate freshness function is determined 716 and the current date, item age, and/or other such information is used to calculate an appropriate freshness factor 718. As should be understood, the order of the freshness, seasonality, and/or other relevance determinations can be done in any order, or concurrently, and that additional, fewer, or alternative steps can be used within the scope of the various embodiments.

Once any freshness and/or seasonality factor is determined, the freshness and/or seasonality factor can be applied to, or otherwise factored in with, any other utilized relevance or ranking data 720 to generate a final relevance or ranking score for each item 722. The final ranking or relevance scores of the items can be used to select and/or order items to display and/or feature to a customer 724, as well as other aspects such as where or how to display the items or other such content. In different embodiments, this can include selecting and ordering items to display based upon the values, while in other embodiments this can determine where on a page certain items are displayed (e.g., feature frames), etc.

The following examples are included to demonstrate how aspects such as freshness and seasonality can evolve over time for different items. In one example, a brand new designer summer dress is first available on an electronic marketplace on Apr. 15, 2010. The "seasons" attribute for the item is "summer," so the seasonality for the item is calculated based on the "summer" seasonal time plot. From the attributes, it can also be determined that the item is a "fashion" item, such that the freshness can be calculated based on the fashion freshness time plot. The following represents how the scores might evolve over time:

Apr. 15, 2010—The item is one day old with respect to the marketplace. Both the seasonal score and the freshness scores are very high. To refer back to the "pyramid" graph of FIG. 4, at this point in time this item could be considered to be "New Fashion".

May 1, 2010—The item is 15 days old, and the season is past the "peak" of summer (per Apparel seasons). Both the seasonal and freshness score drop, as the item fell from "New Fashion" to "Fashion" in the pyramid.

Sep. 1, 2010—The item is considered "old," and no longer "in season." Both scores are now relatively low, as the item is at the bottom level of the pyramid.

Apr. 15, 2011—The item is back in season, but the item is now old. The seasonal score is high, but the freshness score is low. At this point, the item can be at the "Clearance" level of the pyramid.

In another example, a pair of standard khaki summer shorts is introduced for the first time on the same date (here Apr. 15, 2010) as the fashion summer dress. Assuming the "seasons" attribute is the same ("summer"), the seasonality for the shorts will be calculated exactly as above. However, the attributes for the item do not indicate that the item is a fashion item (or indicate that the item is not a fashion item), such that the freshness is calculated based on a non-fashion freshness time plot, which in this example will be assumed to be a flat plot for items not having a dedicated freshness plot associated therewith. In this case, the Freshness score remains average, or substantially unchanged, over time. The following represents how the scores might evolve over time:

Apr. 15, 2010, May 1, 2010, and Apr. 15, 2011—The seasonal score is high or very high, and the freshness score (here constant) is average. To refer back to the "pyramid" graph, at these points in time this item could be considered "Seasonal Basics".

Sep. 1, 2010—The item is no longer in season, such that the seasonal score is low. This could again represent the bottom level of the pyramid).

The examples above highlight how apparel variations can be implemented in various embodiments. It should be understood, however, that such features can be applicable for other categories as well. As discussed, the features can be used together or independently in various embodiments. In some cases the factors might be applied similarly, while in other embodiments the factors might be applied in different ways. For example, a freshness score might be used as a multiplier to an overall ranking score, while a seasonality score might be used to adjust a popularity score that is used to generate the overall ranking or relevance score. In other cases, both might be used as multipliers to the same type of score, etc. For example, a "consumer electronics" category could utilize different freshness plots to express the fact that different categories of products age differently: printers age quickly, while digital cameras typically last longer on the market. A "jewelry/watches" category could define various seasonal plots and associate some products to Valentine's Day, Mother's Day, or Father's Day. An "office products and supply" category could define a "back to school" season to be attached to some products. Various other categories can be defined and seasons applied within the scope of the various embodiments.

The types of plots, models, algorithms, or functions implemented also can vary between providers, categories, etc. For example, the plot described above with respect to FIG. 5 provides at least some level of bump for a seasonal item during the duration of the respective season. Some providers, however, might prefer to only provide an initial adjustment at the beginning of the season, to have the seasonal items prominently displayed to a customer as soon as possible. After the first couple of days, weeks, or at least after enough data has been accumulated to provide a proper popularity or other such determination, etc., the provider might no longer wish to provide a bump to particular seasonal items. As should be expected, some of the seasonal items will be popular and some of the items will not be very popular. A provider might prefer not to adjust seasonal items that are not popular, as the provider might prefer to feature items that the customer might purchase even if the end result is that the provider (or other party offering the item) might have to sell the item at a loss after the end of the season. Further, a provider might want to give a temporary bump down to seasonal items at the beginning of the next season, but remove the adjustment after a period of time such that conventional behavioral and other ranking algorithms can be used.

In some embodiments, the functions applied to various categories, items, providers, etc., can be tuned over time. For example, a provider might initially apply a base model such as "fashion" to an entire category of items, such as all items in a "fashion apparel" category. The base model can be determined using any appropriate information, such as historical performance or behavioral information. In other embodiments, one or more category "experts" might determine the basic model to be applied. For example, a provider employee with expert knowledge in the apparel industry can specify how adjustments should be made, in general, for items in that category. This model can initially be applied to all items in the category, for example, as well as any new items added to the category. Over time, however, the model can be tuned to more accurately reflect user behavior, such as by using one or more machine-learning algorithms. For example, even if the general trend in the industry shows that the first two weeks that a fashion item is available are the most critical, purchasing behavior on a particular electronic marketplace might indicate that the first week or even first twenty days are the most critical on average. Further, different sub-categories might have different behaviors, as the critical time to market designer shoes might be different than the critical time to market designer pants or dresses. Even within those sub-categories there might be critical differences, as items from certain designers might need to be featured within the first week, while other designers can be featured to some extent over the entire season.

Further, a provider of an electronic marketplace might offer items from various merchants, for example, and items from specific merchants might need different adjustments than those from other merchants. In some embodiments, the curves can also be adjusted based on customer behavior. For example, if a customer does not purchase fashion items, the adjustments may not be applied for that user. If a customer is a late adopter of fashions, the freshness factor can be time-shifted or otherwise adapted to optimize the item ranking at any time. Further, the adjustments can vary based on geographical location. For example, certain areas might be more likely to purchase items only within the first week after release, while certain geographic areas might be later adopters of new fashions. Further, factors such as age and gender might also be used to adjust or tune the curves, as the critical period for younger women might be very different than the critical period for older men, etc. Any of a number of different manipulations and optimizations can be used as should be apparent to one of ordinary skill in the art in light of the teachings and suggestions contained herein.

Such a system can utilize one or more category manager components and/or interfaces that enable the provider to apply and manage the algorithms, functions, curves, or other such aspects that are applied to various items of content over time. In some embodiments, the freshness and/or seasonality determinations can be provided as part of a third party service, wherein the third party can perform tasks such as collecting data, monitoring industry trends, etc., and can provide adjustment factors and functions to be applied to various types of content.

Further, various approaches can be used to decide the level(s) at which to provide specific seasonal and/or freshness factors. For example, providing algorithms at the highest category level can be relatively easy to manage, but can provide less than optimal results in at least some embodiments. On the other hand, attempting to provide specialized algorithms for each item or sub-category can be difficult to manage, and there might not be enough data at each of these levels to provide accurate results. Accordingly, in at least one embodiment the levels are determined by, and can change over time based at least in part upon, the amount of data available at each level and/or the variation of the data at each level. For example, designer jeans might have a much different lifecycle than everyday jeans, such that algorithms can be used for the different sub-categories if there is enough data for each sub-category. It might not be desirable to select an optimal curve for each type of item in the sub-category, however, as the variation between items in the category can be so slight as to not be worth the extra overhead. In some cases, a default curve can be applied to all subcategories in a category, and the system can learn over time and adjust curves for categories and subcategories where there is enough data and/or where the curve would be significantly different. There also can be some decay built into the functions, such that the curves adapt over time. For example, a certain type of item that is very popular during a specific trend might have a very different curve after the trend subsides. Thus, it can be desirable to rely upon more recent information over time.

As discussed, the type and number of seasons used for seasonality can vary as well. For example, a season might be determined for each professional sport for which items or content is offered. Further, some hybrid seasons might be generated, such as for short sleeve shirts that might be popular during late spring, summer, and early fall. Further, "spring" in the apparel industry is shifted from the actual spring season, such that there might be different season adjustments for each. For items such as evergreen items that do not vary significantly over the course of the year, there might either be no curve defined or a curve that is substantially constant. Seasons such as "back to school" might be defined, where the "same" season can vary based upon factors such as location. Some items of content also might have one or more applicable seasons. For example, short sleeve shirts with a professional sport team logo might have "spring," "summer," "fall," and "sport-specific" seasons that apply. While in some embodiments a provider might select one of these seasons, in other embodiments the provider might select multiple or all seasons, and the system can aggregate the functions to come up with a single value at any time. As discussed, the various embodiments can be used with many types of content, not just apparel and consumable items, such that any seasonal adjustment can be used as is appropriate for the type of content (e.g., television seasons, political campaign seasons, news cycles, electronics expositions, etc.).

Figure 8:
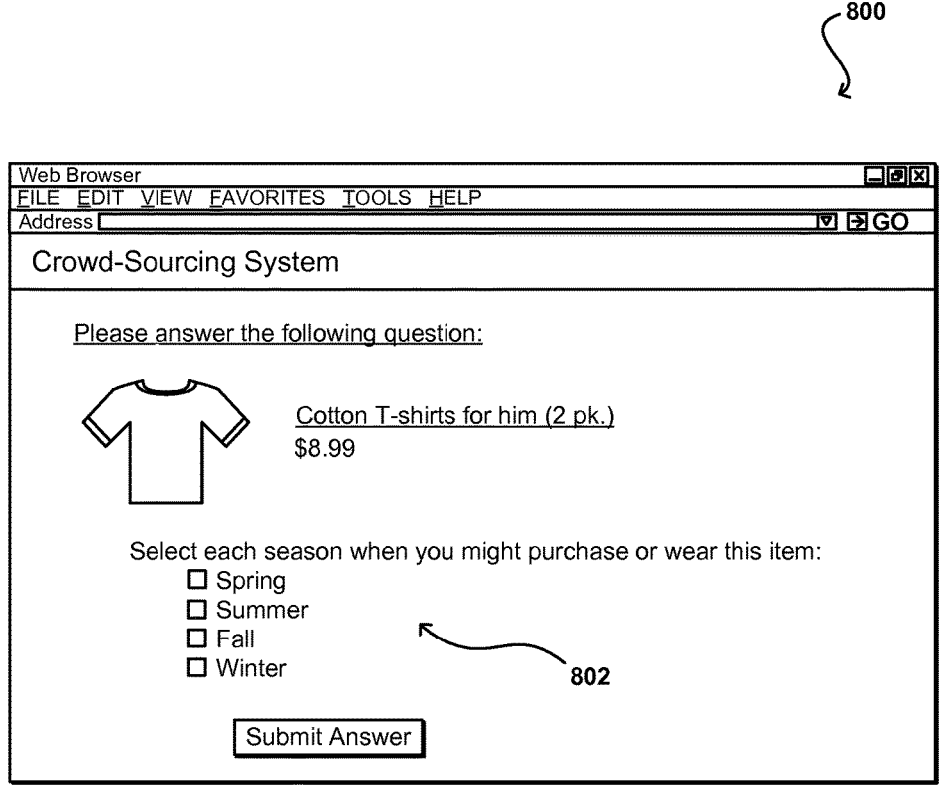
FIG. 8 illustrates an example display including a task for a crowd-sourcing system that can be utilized in accordance with one embodiment.

In some embodiments, a provider might not want to rely on experts for each particular sub-category of items, may not want to manually develop default curves, might not want to develop software to analyze trends, etc. In such cases, information can be passed to a system such as a crowd-sourcing system to attempt to determine when people think specific items or types of items would most be of interest, would have the most appeal, etc. An example of a crowd-sourcing system is described in co-pending U.S. patent application Ser. No. 10/990,949, filed Nov. 16, 2004, entitled "Providing an Electronic Marketplace to Facilitate Human Performance of Programmatically Submitted Tasks," which is hereby incorporated by reference. In other embodiments, such an approach can be used when there is not enough data, no existing default algorithm, etc. One such analysis system utilizes a series of questions or "tasks" to obtain levels of relevance of various service categories to various items, item categories, content, types of content, pages, etc. In one example, a provider is able to send requests to the crowd-sourcing system (or service) to obtain the desired information. FIG. 8 illustrates an example of a display page 800, including a question 802 asking the season(s) when a particular item might be purchased or used. A user or member of the crowd-sourcing system, referred to herein as a "worker," who is logged into the analysis system can receive the question as a work item, and can provide the worker's input as to the level of relevance, relatedness, etc. In many cases, the task will be provided to multiple workers in order to obtain a more accurate level of relatedness overall. For example, different people can have different interpretations or understandings of relatedness, and it can be beneficial to average or otherwise aggregate the interpretations of multiple users. The analysis system then can aggregate and/or analyze the results for use in determining an adjustment function.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
a processor; and
a non-transitory memory device including instructions that, when executed by the processor, cause the system to:
determine a plurality of items available for selection in an electronic inventory;
calculate a cycle score for each item of the plurality of items, the cycle score correlated to a demand cycle associated with at least one category of a respective item, wherein the cycle score is an output of at least one dynamic cyclical function of a plurality of cyclical functions and depends on the least one category of the respective item and an input of time elapsed from start of a repeating cycle;
calculate an age score for each item of the plurality of items, wherein the age score is an output of at least one age function of a plurality of age functions, and depends on an input of time elapsed from a time of first availability of a respective item;
compute a ranking score of each of the plurality of items based at least in part on user behavior associated with each of the plurality of items, the respective cycle score and the respective age score of each of the plurality of items, the user behavior correlated with each dynamic cyclical function and each age function;
generate a ranking of the plurality of items according to the ranking score of each of the plurality of items;
determine demand data for one or more items of the plurality of items;
derive an additive or multiplicative factor for each of the one or more items based on the demand data;
calculate an adjustment score for each of the one or more items, each adjustment score associated with at least one adjustment function of a plurality of adjustment functions and based on the respective additive or the multiplicative factor;
adjust the ranking score for each of the one or more items by an amount corresponding to the adjustment score to generate an adjusted ranking score for each of the one or more items;
determine an adjusted ranking of the plurality of items based at least in part on the adjusted ranking scores of the one or more items; and generate a display of at least a portion of the plurality of items according to the adjusted ranking.

2. The system of claim 1, wherein the memory device further includes instructions that, when executed by the processor, cause the system to:
compile a first set of purchase history data;
compile a second set of purchase history data;
determine that the first set of purchase history data differs from the second set of purchase history data by an amount corresponding to a temporal measure; and
time shift at least one age function corresponding to the first set of purchase history data to account for the temporal measure.

3. The system of claim 1, wherein the memory device further includes instructions that, when executed by the processor, cause the system to:
increase the age score over a first time period, the first time period being measured from the time of first availability of the item; and
decrease the age score for a second time period, the second time period being subsequent to the first time period.

4. The system of claim 1,
wherein a first cyclical function of the plurality of cyclical functions is associated with a cycle length of one year, and a second cyclical function of the plurality of cyclical functions is associated with a cycle length of less than a year; and
wherein each of the plurality of cyclical functions is modeled as a set of discrete points, the set of discrete points including one or more of an inflection point, a discontinuity, and an end point.

5. The system of claim 1, wherein at least a portion of the age functions and the cyclical functions correspond to different categories of items.

6. The system of claim 5, wherein one or more of the age functions and the cyclical functions are associated with one or more of the items using one or more attributes of the items.

7. The system of claim 1, wherein at least one of the plurality of cyclical functions and at least one of the age functions provides positive, negative, and zero values at different points in time.

8. The system of claim 1, wherein the memory device further includes instructions that, when executed by the processor, cause the system to:
apply at least one default function to each item; and
tune the at least one default function for at least some of the items over time to produce at least one optimized function, the at least one optimized function applying to at least one of an item, a class of items, a type of items, a group of items, a category of items, or a sub-category of items, the optimized function further corresponding to an age function or a cyclical function.

9. A computer-implemented method, comprising:
determining a plurality of items available for purchase selection in an electronic inventory;
calculating a cycle score for each item of the plurality of items, the cycle score correlated to a demand cycle associated with at least one category of a respective item, wherein the cycle score is an output of at least one dynamic cyclical function of a plurality of cyclical functions and depends on the at least one category of the respective item and an input of time elapsed from start of a repeating cycle;
calculating an age score for each item of the plurality of items, wherein the age score is an output of at least one age function of a plurality of age functions and depends on the at least one category of the respective item and an input of time elapsed from a time of first availability of a respective item;
computing a ranking score of each of the plurality of items based at least in part on user behavior associated with the each of the plurality of items, the respective cycle score and the respective age score of each of the plurality of items, the user behavior correlated with each dynamic cyclical function and each age function;
computing a ranking of the plurality of items according to the ranking score of each of the plurality of items;
determining demand data for one or more items of the plurality of items;
deriving an additive or multiplicative factor for each of the one or more items based on the demand data;
calculating an adjustment score for each of the one or more items, the adjustment score associated with at least one adjustment function of a plurality of adjustment functions and based on the respective additive or the multiplicative factor;
adjusting the ranking score for each of the one or more items by an amount corresponding to the respective adjustment score to generate an adjusted ranking score for each of the one or more items;
determining an adjusted ranking of the plurality of items based at least in part on the adjusted ranking scores of the one or more items; and
generating a display of at least a portion of the plurality of items for display according to the adjusted ranking.

10. The computer-implemented method of claim 9, further comprising:
increasing the age score over a first time period, the first time period being measured from the time of first availability of the item; and
decreasing the age score for a second time period, the second time period being subsequent to the first time period.

11. The computer-implemented method of claim 9, further comprising:
compiling a first set of purchase history data;
compiling a second set of purchase history data;
determining that the first set of purchase history data differs from the second set of purchase history data by an amount corresponding to a temporal measure; and
time shifting at least one age function corresponding to the first set of purchase history data to account for the temporal measure.

12. The computer-implemented method of claim 11, wherein at least one of the plurality of cyclical functions and at least one of the age functions provides positive, negative, and zero values at different points in time.

13. The computer-implemented method of claim 9, wherein each of the plurality of cyclical functions is modeled as a set of discrete points, the set of discrete points including one or more of an inflection point, a discontinuity, and an end point.

14. The computer-implemented method of claim 9, wherein a first cyclical function of the plurality of cyclical functions is associated with a cycle length of one year, and a second cyclical function of the plurality of cyclical functions is associated with a cycle length of less than a year.

15. A computer-implemented method, comprising:
classifying a plurality of items into one or more item categories;

determining one or more age functions for each of the plurality of items, each age function having a varying input of time elapsed from a time of first availability of a respective item;

modifying the one or more age functions based on the one or more item categories into which the respective items are classified;

calculating an age score for each of the plurality of items, the age score being an output of one or more age functions, the age score for an item incrementally increasing more than one time over a first time period, the first time period being measured from the time of first availability of the item, the age score associated with each age function decreasing for a second time period, the second time period being subsequent to the first time period;

determining a ranking score of each of the plurality of items based at least in part on user behavior associated with each of the plurality of items, the respective age score of each of the plurality of items, the user behavior fluctuating with a dynamic cyclical function and each age function;

determining demand data for one or more items of the plurality of items;

deriving an additive or multiplicative factor from the demand data for each of the one or more items;

calculating an adjustment score for each of the one or more items, each adjustment score associated with at least one adjustment function of a plurality of adjustment functions and based on the additive or the multiplicative factor; and adjusting the ranking score for each of the one or more items by an amount corresponding to the adjustment score to generate an adjusted ranking score for each of the one or more items.

16. The computer-implemented method of claim 15, further comprising:

applying at least one default function to each item; and tuning the at least one default function for at least some of the items over time to produce at least one optimized function, the at least one optimized function applying to at least one of an item, a class of items, a type of items, a group of items, a category of items, or a sub-category of items, the optimized function further corresponding to an age function.

17. The computer-implemented method of claim 15, wherein one or more of the items are displayed in feature frames of a web page associated with an electronic marketplace, the one or more items displayed in feature frames determined according to the ranking score for each of the items.

* * * * *